United States Patent
Yeh et al.

(10) Patent No.: US 9,348,718 B2
(45) Date of Patent: May 24, 2016

(54) APPARATUS AND METHOD FOR COMPUTER DEBUG

(71) Applicant: Nuvoton Technology Corporation, Hsinchu (TW)

(72) Inventors: Shih-Hao Yeh, Yangmei (TW); Shih-Hsuan Yen, Zhubei (TW)

(73) Assignee: Nuvoton Technology Corporation, Hsinchu Science Park (TW)

( * ) Notice: Subject to any disclaimer, the term of this patent is extended or adjusted under 35 U.S.C. 154(b) by 173 days.

(21) Appl. No.: 14/075,583

(22) Filed: Nov. 8, 2013

(65) Prior Publication Data

US 2015/0074460 A1  Mar. 12, 2015

(30) Foreign Application Priority Data

Sep. 6, 2013 (TW) .............................. 102132150 A

(51) Int. Cl.
*G06F 11/00* (2006.01)
*G06F 11/22* (2006.01)

(52) U.S. Cl.
CPC .................................. *G06F 11/2284* (2013.01)

(58) Field of Classification Search
CPC ............ G06F 11/2278; G06F 11/2284; G06F 11/3031; G06F 11/3058; G06F 11/328
See application file for complete search history.

(56) References Cited

U.S. PATENT DOCUMENTS

| | | | |
|---|---|---|---|
| 6,138,240 A | 10/2000 | Tran et al. | |
| 7,804,672 B2 | 9/2010 | Tonry et al. | |
| 2006/0236087 A1* | 10/2006 | Ha | 713/2 |
| 2012/0068985 A1* | 3/2012 | Tsai et al. | 345/211 |
| 2012/0137179 A1* | 5/2012 | Chin et al. | 714/36 |

FOREIGN PATENT DOCUMENTS

| | | |
|---|---|---|
| CN | 100419646 C | 9/2008 |
| CN | 101907914 A | 12/2010 |
| CN | 102023909 A | 4/2011 |
| CN | 102081564 A | 6/2011 |
| CN | 201867678 U | 6/2011 |
| CN | 102243601 A | 11/2011 |
| TW | 201321965 A | 6/2013 |

OTHER PUBLICATIONS

The Office Action of its corresponding TW application 102132150 issued on Mar. 30, 2015 (1-10 pages).
Office Action and Search Report issued on May 28, 2015 in corresponding TW application No. 102132150 (1-13 pgs.).

* cited by examiner

*Primary Examiner* — Michael Maskulinski
(74) *Attorney, Agent, or Firm* — Muncy, Geissler, Olds & Lowe, P.C.

(57) ABSTRACT

A computer debug module for use in a computer at least includes a power sequence monitor module. The power sequence monitor module includes a monitor unit, a register, and an output control unit. The monitor unit is configured to monitor a plurality of power sequence signals relative to the computer and generate a monitor result. The register is configured to store the monitor result. When the power sequence monitor module operates in a debug mode, the output control unit generates a detection signal according to the stored monitor result and transmits the detection signal to an output device.

11 Claims, 7 Drawing Sheets

APPARATUS AND METHOD FOR COMPUTER DEBUG

CROSS REFERENCE TO RELATED APPLICATIONS

This application claims priority of Taiwan Patent Application No. 102132150 filed on Sep. 6, 2013, the entirety of which is incorporated by reference herein.

BACKGROUND OF THE INVENTION

1. Field of the Invention

The disclosure generally relates to a computer debug module, and more particularly, relates to a computer debug module for simply determining why a computer is unbootable.

2. Description of the Related Art

When a computer is abnormal and unbootable, a computer repairman usually directly demounts the SIO (Super Input/Output) chip from the motherboard. However, the abnormal boot of the computer may be not caused by the SIO chip, and the displacement of the chip is unnecessary and time-consuming.

In prior art, a debug card (e.g., Port80 Debug Card) is used to determine why the computer is unbootable, but when the motherboard of the computer cannot be powered on, its BIOS (Basic Input Output System) is disabled, and the cause of the unbootable computer cannot be analyzed by the conventional debug card.

BRIEF SUMMARY OF THE INVENTION

To solve the problem in the prior art, in one exemplary embodiment, the disclosure is directed to a computer debug module for use in a computer, comprising: a power sequence monitor module, comprising: a monitor unit, monitoring a plurality of power sequence signals relative to the computer, and generating a monitor result; a register, storing the monitor result; and an output control unit, wherein when the power sequence monitor module operates in a debug mode, the output control unit generates a detection signal according to the stored monitor result and transmits the detection signal to an output device.

In another embodiment, the disclosure is directed to a method for computer debug, comprising the steps of: when a computer is abnormal or unbootable, monitoring a plurality of power sequence signals relative to the computer by a computer debug module to generate a monitor result; storing the monitor result by the computer debug module; determining whether to enter a debug mode by the computer debug module according to a control signal; in the debug mode, generating a detection signal by the computer debug module according to the stored monitor result; and in the debug mode, transmitting the detection signal to an output device by the computer debug module.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures thereof in the invention are described in detail as follows.

Figure 1:
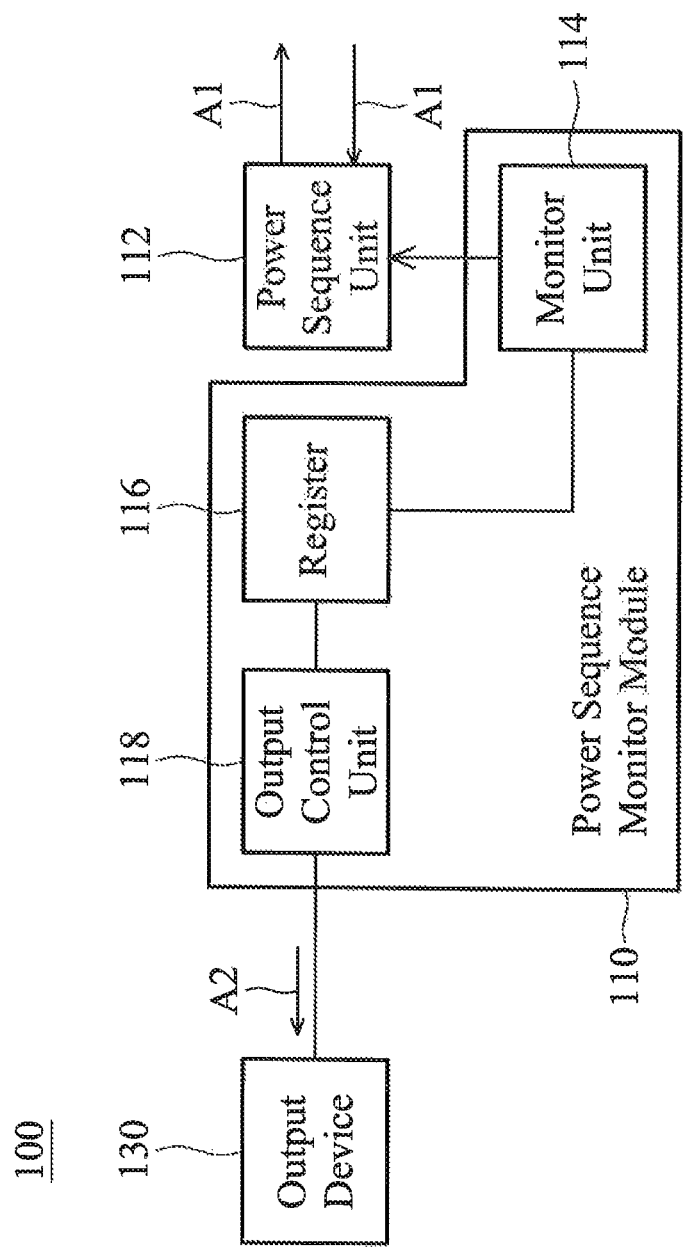
FIG. 1 is a diagram for illustrating a computer debug module according to an embodiment of the invention.

FIG. 1 is a diagram for illustrating a computer debug module 100 according to an embodiment of the invention. The computer debug module 100 may be used for a computer, such as a desktop PC (Personal Computer) or an NB (Notebook Computer). The computer debug module 100 at least includes a power sequence monitor module 110. In some embodiments, the computer debug module 100 further includes a power sequence unit 112 and an output device 130. More particularly, the power sequence monitor module 110 includes a monitor unit 114, a register 116, and an output control unit 118. The monitor unit 114 monitors power sequence signals A1 relative to the computer and generates a monitor result. In some embodiments, the power sequence signals A1 come from a chipset on a motherboard of the computer (not shown). In some embodiments, the power sequence unit 112 receives and transmits the power sequence signals A1 relative to the computer, and the monitor unit 114 further monitors the operation of the power sequence unit 112 and checks whether any abnormal event occurs. The register 116 stores the monitor result of the monitor unit 114. The power sequence monitor module 110 selectively enters a debug mode according to a control signal (e.g., a user input signal). When the power sequence monitor module 110 operates in the debug mode, the output control unit 118 generates a detection signal A2 according to the stored monitor result and transmits the detection signal A2 to the output device 130. The output device 130 may be a display device or a transmission interface, and will be described in detail in the following embodiments. For example, when the computer is unbootable, a computer repairman can control the power sequence monitor module 110 to enter the debug mode, and can further ascertain the cause of the unbootable computer according to the output detection signal A2.

Figure 2:
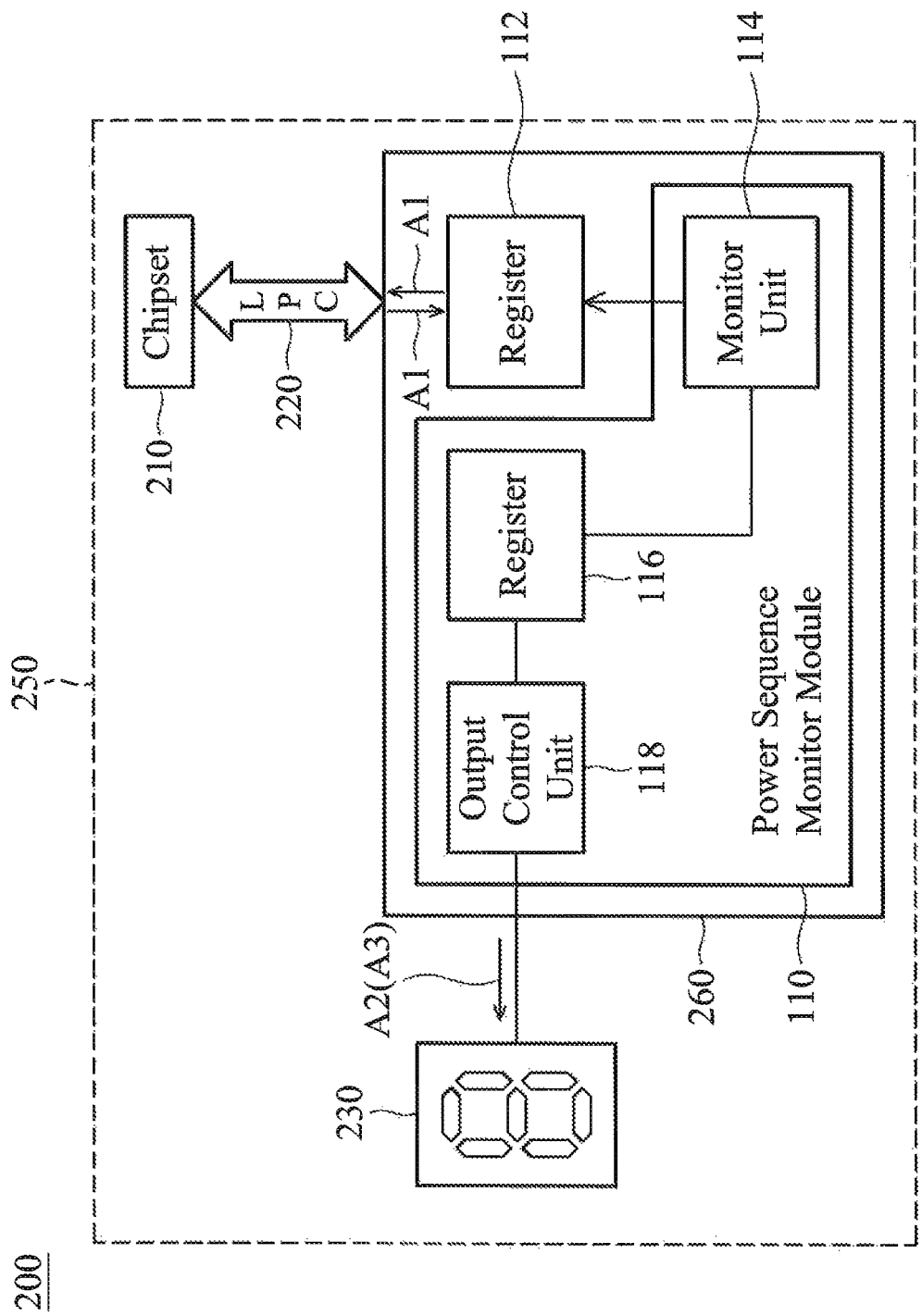
FIG. 2 is a diagram for illustrating a computer debug module according to an embodiment of the invention.

FIG. 2 is a diagram for illustrating a computer debug module 200 according to an embodiment of the invention. In the embodiment of FIG. 2, the power sequence monitor module 110 and the power sequence unit 112 are integral in an SIO (Super Input/Output) chip 260. In other embodiments, the power sequence monitor module 110 and the power sequence unit 112 are integral in an EC (Embedded Controller) 260. As shown in FIG. 2, the computer debug module 200 further includes a chipset 210 and an LPC (Low Pin Count) interface 220, and the output device of the computer debug module 200 is a 7-segment display device 230. The chipset 210 is coupled to a CPU (Central Processing Unit) of the computer (not shown) and communicates with the power sequence unit 112 of the SIO chip 260 (or the EC 260). The LPC interface 220 is coupled between the chipset 210 and the SIO chip 260 (or the EC 260). The power sequence signals A1 are transmitted between the chipset 210 and the SIO chip 260 (or the EC 260) through the LPC interface 220. In some embodiments, the chipset 210, the LPC interface 220, the SIO chip 260 (or the EC 260), and the 7-segment display device 230 are all disposed on a motherboard 250 of the computer. The monitor unit 114 of the power sequence monitor module 110 may monitor the power sequence signals A1 as described in the embodiment of FIG. 1. When the power sequence monitor module 110 operates in the debug mode, the output control unit 118 generates the detection signal A2 according to the stored monitor result. The detection signal A2 may include a debug code A3 (e.g., a number from 0 to 9, or an English character, which respectively represents different error events, but is not limited thereto). The 7-segment display device 230 displays the debug code A3 according to the detection signal A2. Therefore, a computer repairman can directly determine the cause of the unbootable computer by viewing the 7-segment display device 230. In other embodiments, the computer debug module 220 includes more 7-segment display devices 230 to display more numbers.

Figure 3:
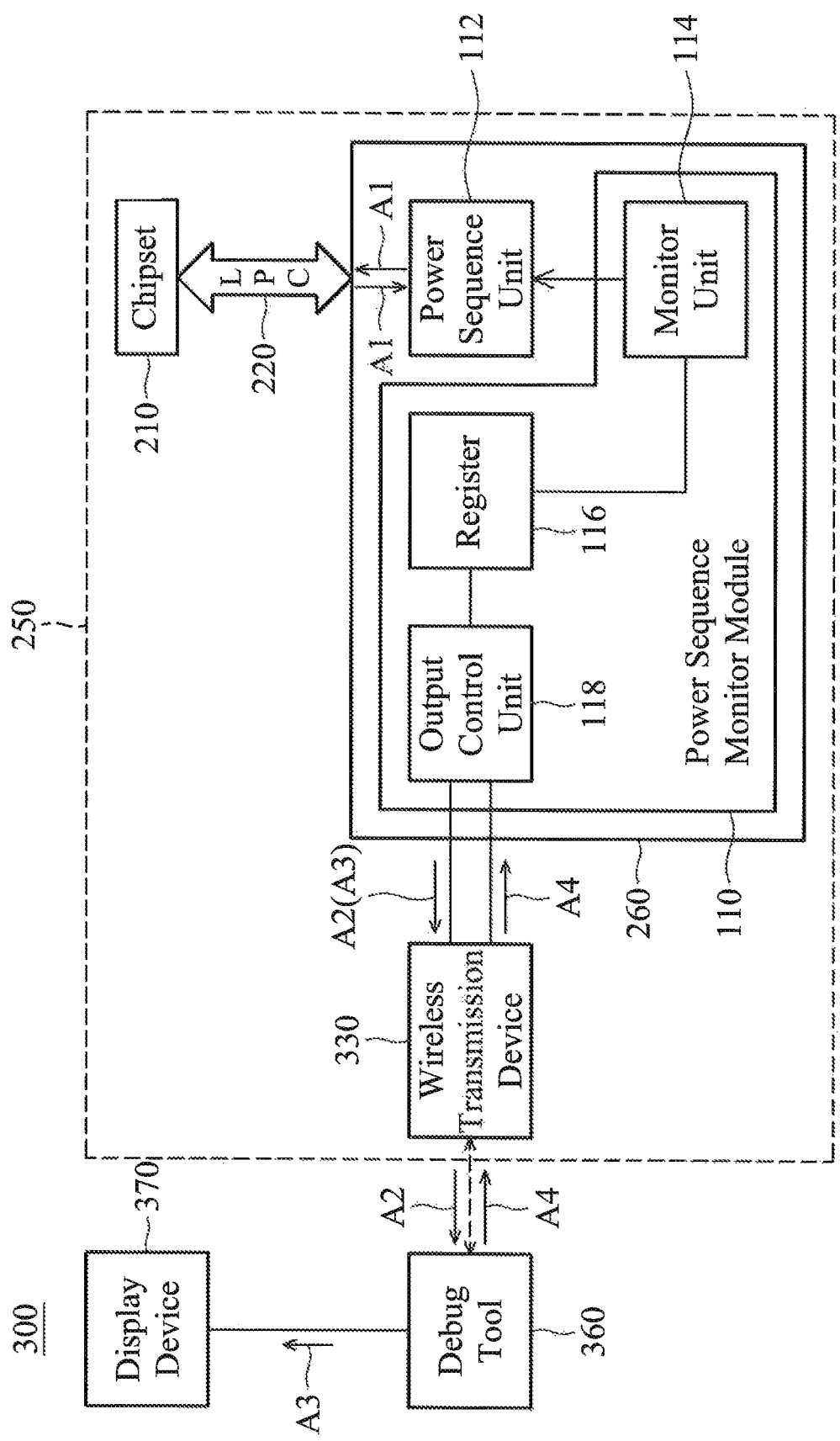
FIG. 3 is a diagram for illustrating a computer debug system according to an embodiment of the invention.

FIG. 3 is a diagram for illustrating a computer debug system 300 according to an embodiment of the invention. In the embodiment of FIG. 3, the output device of the computer debug system 300 is a wireless transmission device 330, which is disposed on the motherboard 250 of the computer. For example, the wireless transmission device 330 may be a CIR (Consumer Infrared) module, a Bluetooth module, or a Wi-Fi module, but it is not limited thereto. As shown in FIG. 3, the computer debug system 300 further includes a debug tool 360 and a display device 370, which are independent of the motherboard 250. The debug tool 360 may establish a wireless connection to the wireless transmission device 330. More particularly, the debug tool 360 may transmit a control signal A4 through the wireless transmission device 330 to the output control unit 118 of the power sequence monitor module 110, and may control the power sequence monitor module 110 to enter the debug mode. The monitor unit 114 of the power sequence monitor module 110 may monitor the power sequence signals A1 and generate the monitor result as described in the embodiment of FIG. 1. When the power sequence monitor module 110 operates in the debug mode, the output control unit 118 generates the detection signal A2 according to the stored monitor result. In some embodiments, the computer debug module 300 includes one or more output devices (Only one wireless transmission device 330 is shown in FIG. 3), and the output control unit 118 of the power sequence monitor module 110 selects one of the one or more output devices according to the control signal A4. The control signal A4 may be generated by the debug tool 360, or it may be generated according to a user input signal. In some embodiments, the output control unit 118 generates the detection signal A2 having a specific data format according to the control signal A4. In the embodiment of FIG. 3, the output control unit 118 generates the detection signal A2 having a wireless transmission data format (e.g., infrared transmission data format) according to the control signal. In other words, the output control unit 118 may generate the detection signal A2 having different data formats according to the selection of different output devices. Next, the output control unit 118 may transmit the detection signal A2 through the wireless transmission device 330 to the debug tool 360, and the debug tool 360 may obtain a debug code A3 according to the detection signal A2. In some embodiments, the debug code A3 is generated by the debug tool 360 analyzing the detection signal A2. In other embodiments, when the detection signal A2 is transmitted to the wireless transmission device 330, the detection signal A2 has already had the debug code A3. That is, the debug code A3 may be directly generated by the power sequence monitor module 110. In this case, the power sequence monitor module 110 may further selectively output the debug code A3 according to different output methods. The display device 370 is coupled to the debug tool 360 and configured to display the debug code A3. Therefore, a computer repairman can directly determine the cause of the unbootable computer by viewing the display device 370.

Figure 4:
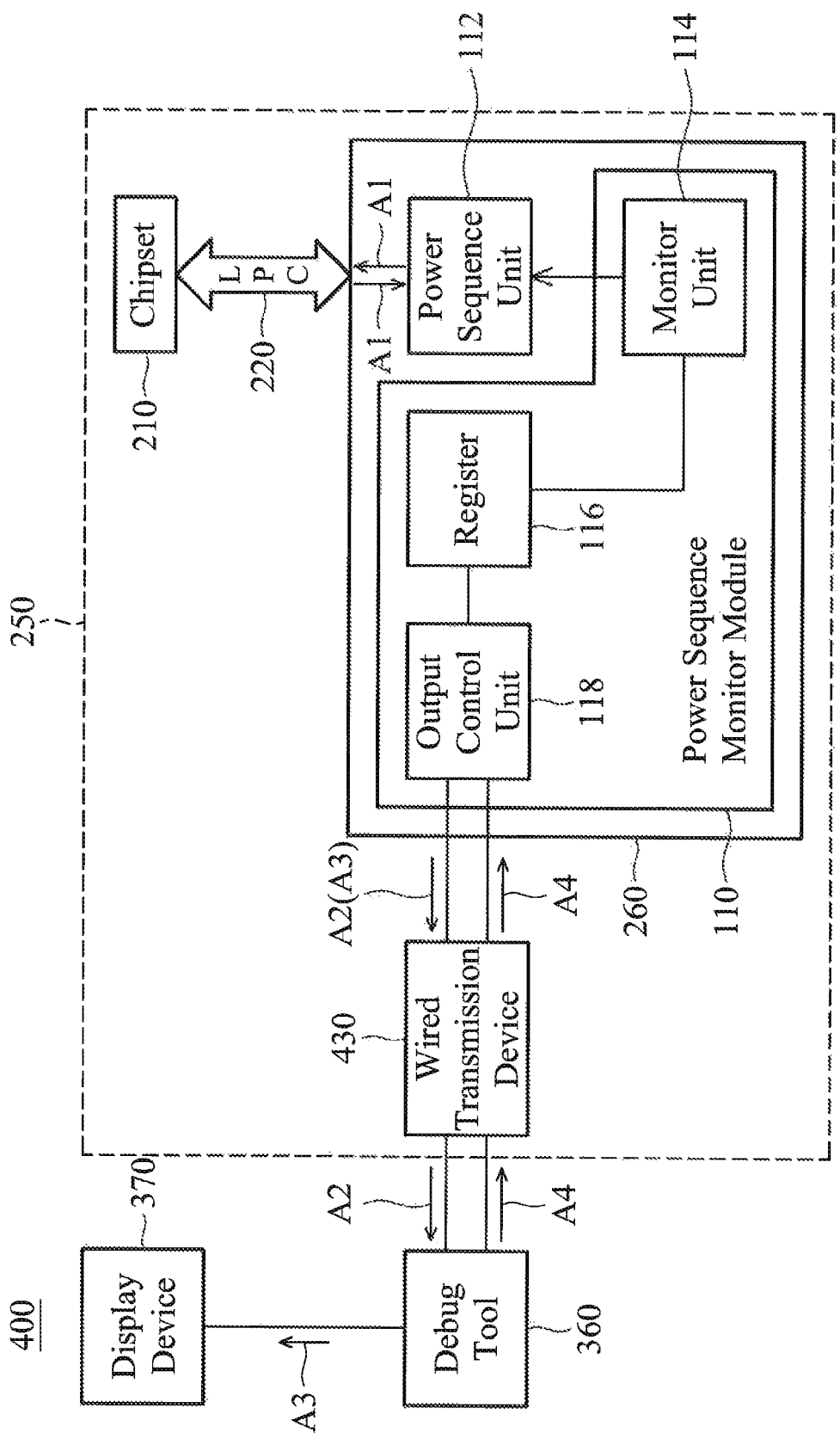
FIG. 4 is a diagram for illustrating a computer debug system according to an embodiment of the invention.

FIG. 4 is a diagram for illustrating a computer debug system 400 according to an embodiment of the invention. The difference between FIG. 4 and FIG. 3 is that the wireless transmission device 330 of FIG. 3 is replaced with a wired transmission device 430 of FIG. 4. In the embodiment of FIG. 4, the output device of the computer debug system 400 is the wired transmission device 430, which is disposed on the motherboard 250 of the computer. For example, the wired transmission device 430 may be a UART (Universal Asynchronous Receiver-Transmitter), an SM-Bus (System Management Bus), a USB (Universal Serial Bus) or a PS/2 interface, but it is not limited thereto. As shown in FIG. 4, the computer debug system 400 further includes a debug tool 360 and a display device 370. The debug tool 360 may establish a wired connection to the wired transmission device 430. The debug tool 360 may obtain the debug code A3 according to the detection signal A2 of the power sequence monitor module 110 as described in the embodiment of FIG. 3. The display device 370 is coupled to the debug tool 360 and configured to display the debug code A3. Therefore, a computer repairman can directly determine the cause of the unbootable computer by viewing the display device 370.

In some embodiments, a computer debug module (or system) includes one or more output devices (e.g., the 7-segment display device 230 of FIG. 2, the wireless transmission device 330 of FIG. 3, and/or the wired transmission device 430 of FIG. 4), and the output control unit 118 of the power sequence monitor module 110 selects one of the output devices according to the control signal A4. The control signal A4 may be generated by the debug tool 360, or it may be generated according to a user input signal. In other words, the power sequence monitor module 110 may select different ways to output the debug code A3 for a computer repairman to view.

Figure 5:
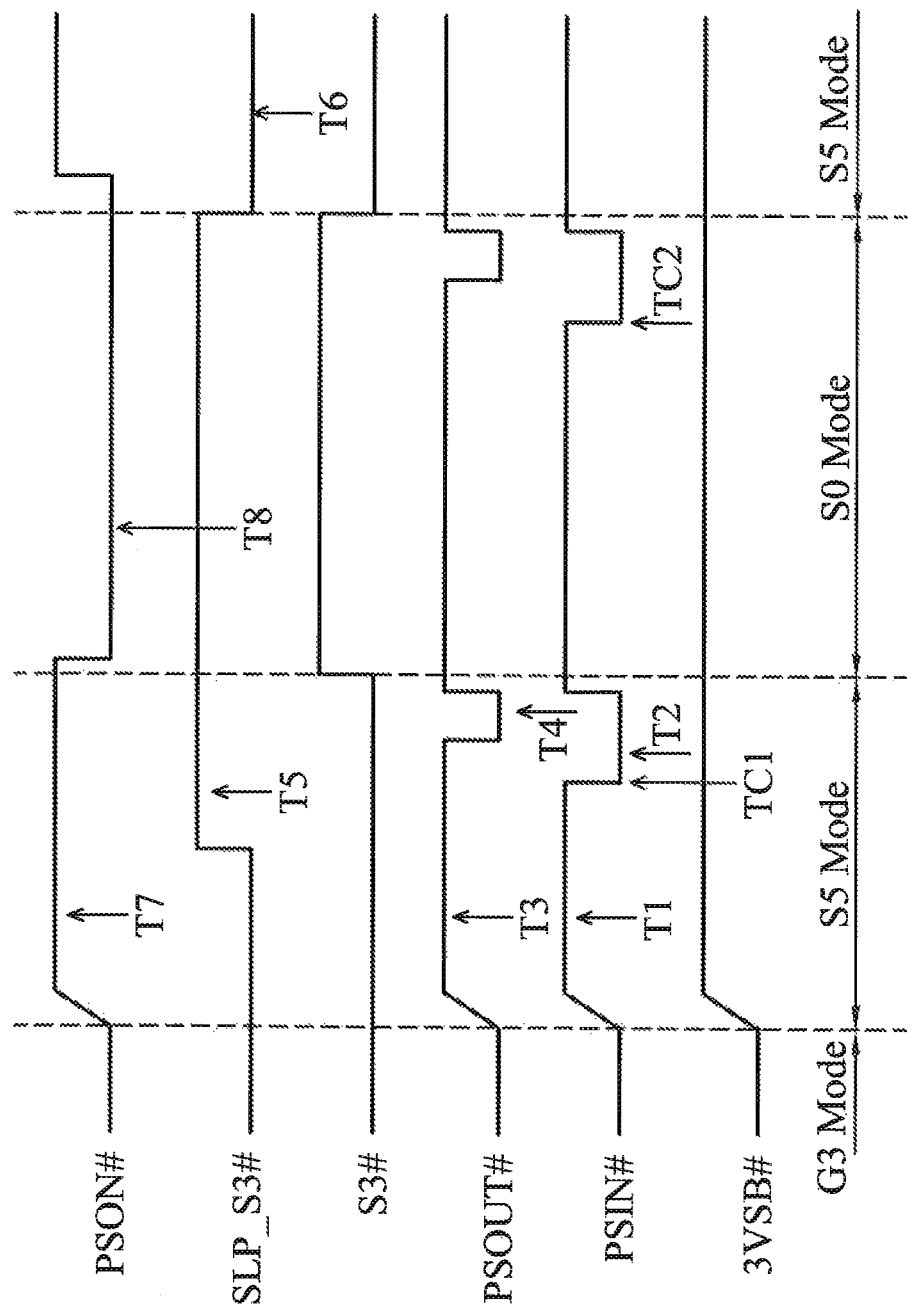
FIG. 5 is a diagram for illustrating waveforms of power sequence signals according to an embodiment of the invention.

FIG. 5 is a diagram for illustrating waveforms of the power sequence signals A1 according to an embodiment of the invention. The horizontal axis represents time, and the vertical axis represents the logic levels of the power sequence signals A1. In the embodiment of FIG. 5, the power sequence unit 112 includes an ACPI (Advanced Configuration and Power Interface) logic circuit. The power sequence signals A1, which are input to or output from the ACPI logic circuit, may include a PSON# signal, an SLP_S3#/S3# signal, a PSOUT# signal, a PSIN# signal, and/or a 3VSB signal, but they are not limited thereto. In some embodiments, the SLP_S3# signal particularly belongs to Intel chipsets, and the S3# signal belongs to other brand's chipsets. The monitor unit 114 of the power sequence monitor module 110 may monitor the logic levels of the power sequence signals A1 at some monitor time points (e.g., T1 to T8, but not limited thereto). FIG. 5 is exemplary for Intel chipsets. However, for other brand's chipsets (e.g., AMD chipsets), the power sequence signals A1 of the ACPI logic circuit may have different names and waveforms, but these signals may still be monitored by the power sequence monitor module 110 at some monitor time points.

In the embodiment of FIG. 5, the ACPI logic circuit operates in a G3 mode, an S5 mode, and an S0 mode, in that order. In the G3 mode, the computer has not been plugged in. In the S5 mode, the computer has been plugged in but its power button has not been pressed. In the S0 mode, the computer has been plugged in and its power button has been pressed. As shown in FIG. 5, the power button of the computer is pressed at a first specific time point TC1 and is released at a second specific time point TC2. According to FIG. 5, the monitor unit 114 of the power sequence monitor module 110 is configured to monitor the logic levels of the specific power sequence signals A1 at eight monitor time points. It is understood that the arrangement and the number of the monitor time points are not limited thereto. Furthermore, in the embodiment of FIG. 5, the monitor unit 114 is configured to monitor, in different power modes, the logic levels of the power sequence signals A1 at some monitor time points. For example, the monitor unit 114 of FIG. 5 may monitor the signals when operating in the S5 mode and the S0 mode. The eight monitor time points of FIG. 5 may be described as follows: (1) the PSIN# signal is monitored at a first monitor time point T1 during the S5 mode; (2) the PSIN# signal is monitored at a second monitor time point T2 during the S5 mode, in which the second monitor time point T2 is after the first specific time point TC1; (3) the PSOUT# signal is monitored at a third monitor time point T3 during the S5 mode; (4) the PSOUT# signal is monitored at a fourth monitor time point T4 during the S5 mode, in which the fourth monitor time point T4 is after the first specific time point TC1; (5) the SLP_S3# signal is monitored at a fifth monitor time point T5 during the S5 mode; (6) the PSON# signal is monitored at a seventh monitor time point T7 during the S5 mode; (7) the PSON# signal is monitored at an eighth monitor time point T8 during the S0 mode after the S5 mode is transferred to the S0 mode; and (8) the SLP_S3# signal is monitored at a sixth monitor time point T6 during the S5 mode after the S0 mode is transferred to the S5 mode. It should be noted that the monitor time points (1) to (8) are not required to be performed in order, and not all of them are required to be performed. For non-Intel chipsets, the monitor time points (5) and (8) may be omitted. The aforementioned arrangement of the eight monitor time points is just exemplary and not limited thereto. The detection signal A2 generated by the power sequence monitor module 110 may indicate the abnormal states of the power sequence signals A1. For example, if the PSOUT# signal is not pulled down to the logic level "0" at the fourth monitor time point T4, the detection signal A2 may indicate a debug code "4" to represent this abnormal state. In some embodiments, the detection signal A2 indicates the monitor time points at which the power sequence signals A1 have normal waveforms. In alternative embodiments, the detection signal A2 indicates the monitor time points at which the power sequence signals A1 have abnormal waveforms. In other embodiments, the detection signal A2 includes the waveform historical records of all of the power sequence signals A1. Therefore, a computer repairman can simply understand why the motherboard of the computer is unbootable by analyzing the detection signal A2 from the power sequence monitor module 110.

Figure 6:
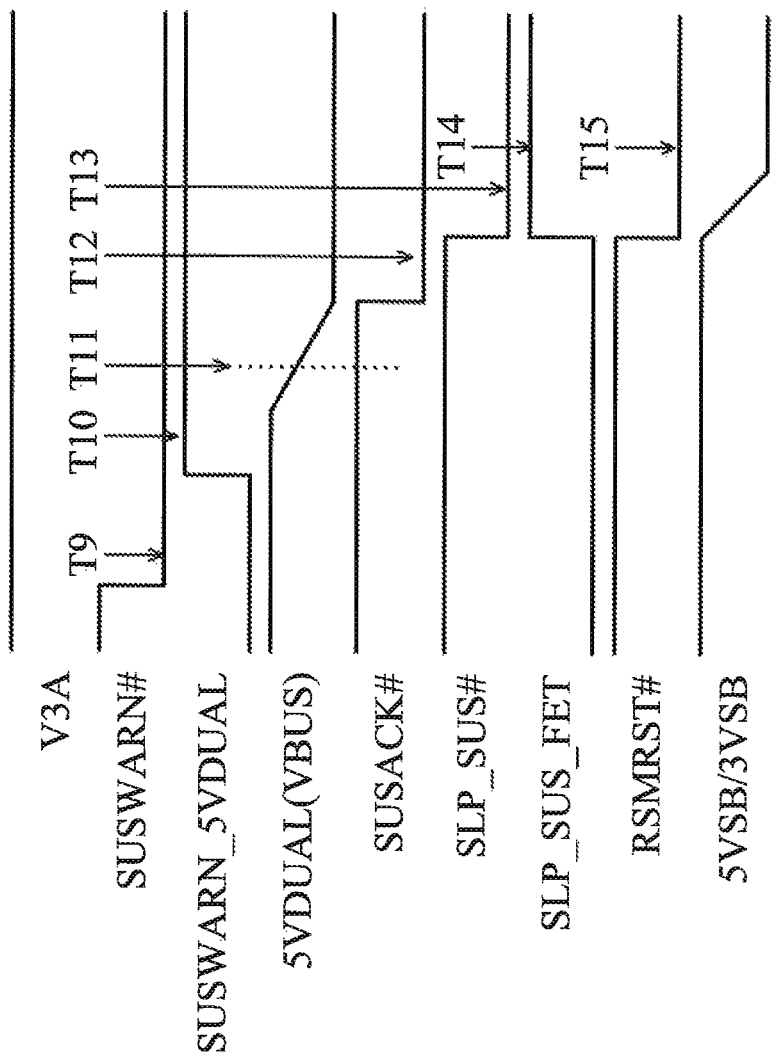
FIG. 6 is a diagram for illustrating waveforms of power sequence signals according to another embodiment of the invention.

FIG. 6 is a diagram for illustrating waveforms of the power sequence signals A1 according to another embodiment of the invention. The horizontal axis represents time, and the vertical axis represents the logic levels of the power sequence signals A1. In the embodiment of FIG. 6, the power sequence unit 112 includes a DSW (Deep Sleep Well) logic circuit. The power sequence signals A1, which are input to or output from the DSW logic circuit, may include a V3A signal, an SUSWARN# signal, an SUSWARN_5VDUAL signal, a 5VDUAL(VBUS) signal, an SUSACK# signal, an SLP_SUS# signal, an SLP_SUS_FET signal, an RSMRST# signal, a 5VSB signal, and/or a 3VSB signal, but they are not limited thereto. The monitor unit 114 of the power sequence monitor module 110 may monitor logic levels of the power sequence signals A1 at some monitor time points (e.g., T9 to T15, but it is not limited thereto).

According to FIG. 6, the monitor unit 114 of the power sequence monitor module 110 is configured to monitor the logic levels of the specific power sequence signals A1 at seven monitor time points. It is understood that the arrangement and the number of the monitor time points are not limited thereto. The seven monitor time points of FIG. 6 may be described as follows: (9) the SUSWARN# signal is monitored at a ninth monitor time point T9; (10) the SUSWARN_5VDUAL signal is monitored at a tenth monitor time point T10; (11) the 5VDUAL(VBUS) signal and the SUSACK# signal are both monitored at an eleven monitor time point T11; (12) the SUSACK# signal is monitored at a twelfth monitor time point T12; (13) the SLP_SUS# signal is monitored at a thirteen monitor time point T13; (14) the SLP_SUS_FET signal is monitored at a fourteenth monitor time point T14; and (15) the RSMRST# signal is monitored at a fifteenth monitor time point T15. As shown in FIG. 6, the monitor time points T9 to T15 are substantially arranged in time order. It should be noted that the monitor time points (9) to (15) are not required to be performed in order, and not all of them are required to be performed. The aforementioned arrangement of the seven monitor time points is just exemplary and not limited thereto. The detection signal A2 generated by the power sequence monitor module 110 may indicate the abnormal states of the power sequence signals A1. For example, if the SUSWARN# signal is not pulled down to the logic level "0" at the ninth monitor time point T9, the detection signal A2 may indicate a debug code "9" to represent this abnormal state. In some embodiments, the detection signal A2 indicates the monitor time points at which the power sequence signals A1 have normal waveforms. In alternative embodiments, the detection signal A2 indicates the monitor time points at which the power sequence signals A1 have abnormal waveforms. In other embodiments, the detection signal A2 includes the waveform historical records of all of the power sequence signals A1. Therefore, a computer repairman can simply ascertain why the motherboard of the computer is unbootable by analyzing the detection signal A2 from the power sequence monitor module 110.

In some embodiments, when the detection signal A2 indicates the monitor time points at which the power sequence signals A1 have abnormal waveforms, those may be caused by a slight change in timing between the power sequence signals A1 or by an imprecise logic level of any power sequence signal. At this time, a computer repairman may apply a reset signal to reset the power sequence signals and recheck whether the computer is bootable after the reset procedure. In some embodiments, there are three kinds of reset signals in the chip. A first reset signal is a system clock reset signal (RTCRST#). The system clock reset signal may be generated by eliminating the CMOS (Complementary Metal-Oxide-Semiconductor) on the motherboard, or by powering off and then powering on the system clock battery on the motherboard. A second reset signal is a computer host reset signal (RSMRST#). The computer host reset signal may be generated by powering off and then powering on the main power source of the computer host. A third reset signal is a soft-boot reset signal (PLTRST#). The soft-boot reset signal may be generated by pressing the reset button on the computer host or by pressing a combination of specific keys on the keyboard to restart the computer. For the third reset signal, there is no need to power off the main power source of the computer host. Different reset signals may be used to reset corresponding power planes of the SIO chip.

Figure 7:
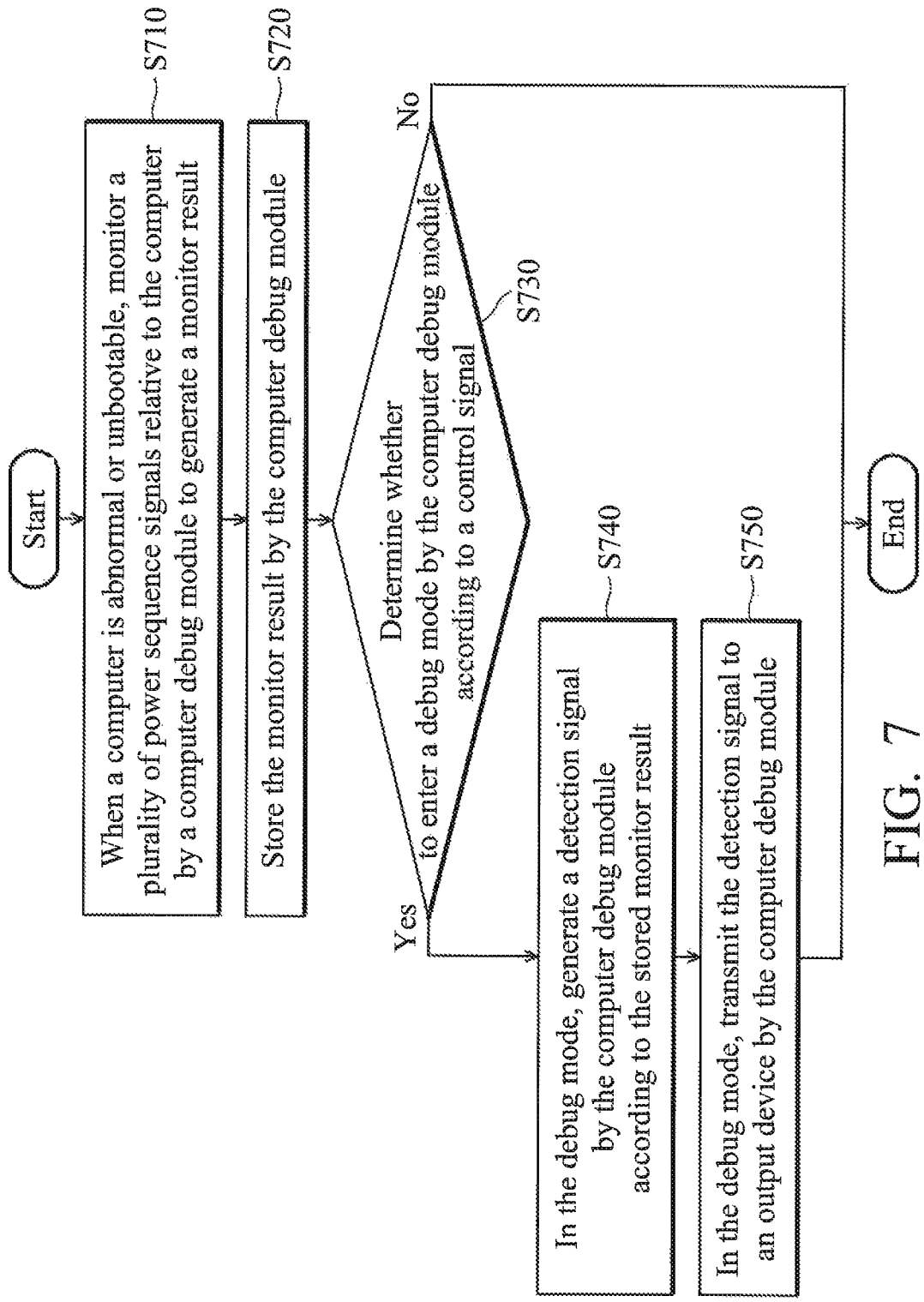
FIG. 7 is a flowchart for illustrating a method for computer debug according to an embodiment of the invention.

FIG. 7 is a flowchart for illustrating a method for computer debug according to an embodiment of the invention. To begin, in step S710, when a computer is abnormal or unbootable, power sequence signals relative to the computer are monitored by a computer debug module to generate a monitor result. In step S720, the monitor result is stored by the computer debug module. In step S730, whether to enter a debug mode is determined by the computer debug module according to a control signal. If not, the procedure will end. If so, in step S740, in the debug mode, a detection signal is generated by the computer debug module according to the stored monitor result. Finally, in step S750, in the debug mode, the detection signal is transmitted to an output device by the computer debug module. It is noted that any one or more features of the embodiments of FIGS. 1-6 may be applied to the method for computer debug as shown in FIG. 7, and these features will not be described here again.

In comparison to the conventional design, the invented apparatus and method for computer debug at least have the following advantages: (1) power sequence signals (boot logic signals) of a motherboard may be checked fast; (2) if the motherboard is unbootable, the reasons may be found in a short time; (3) the probability of demounting an SIO chip on the motherboard is reduced; (4) the invention may be implemented with a simple circuit; and (5) the debug cost and debug time may be effectively reduced.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. A computer debug module for use in a computer, comprising:
   a power sequence monitor module, comprising:
      a monitor unit, monitoring a plurality of power sequence signals relative to the computer, and generating a monitor result;
      a register, storing the monitor result; and
      an output control unit, wherein when the power sequence monitor module operates in a debug mode, the output control unit generates a detection signal according to the stored monitor result and transmits the detection signal to an output device;
   wherein the computer debug module further comprises:
   a power sequence unit, receiving and transmitting the power sequence signals relative to the computer;
   wherein the power sequence monitor module and the power sequence unit are integral in an SIO (Super Input/Output) chip or an EC (Embedded Controller);
   wherein the power sequence signals are digital signals used for communication between the SIO or the EC and another chip of the computer;
   wherein the output device is a wireless transmission device or a wired transmission device, wherein the wireless transmission device is a CIR (Consumer Infrared) module, a Bluetooth module, or a Wi-Fi module, and wherein the wired transmission device is a UART (Universal Asynchronous Receiver-Transmitter), an SM-Bus (System Management Bus), a USB (Universal Serial Bus) or a PS/2 interface;
   wherein the computer debug module further comprises:
   a debug tool, establishing a wireless connection or a wired connection to the output device, and obtaining a debug code according to the detection signal;
   wherein the debug code is generated by the debug tool analyzing the detection signal.

2. The computer debug module as claimed in claim 1, further comprising:
   a chipset, coupled to a CPU (Central Processing Unit) of the computer, and communicating with the power sequence unit; and
   an LPC (Low Pin Count) interface, coupled between the chipset and the SIO chip/EC;
   wherein the chipset, the LPC interface, the SIO chip/EC, and the output device are all disposed on a motherboard of the computer.

3. The computer debug module as claimed in claim 1, wherein the output device is a 7-segment display device.

4. The computer debug module as claimed in claim 3, wherein the detection signal comprises a debug code, and the 7-segment display device displays the debug code according to the detection signal.

5. The computer debug module as claimed in claim 1, wherein when the detection signal is transmitted to the output device, the detection signal has already had the debug code.

6. The computer debug module as claimed in claim 1, further comprising: a display device, coupled to the debug tool, and displaying the debug code.

7. The computer debug module as claimed in claim 1, wherein the debug tool further transmits a control signal to the power sequence monitor module and controls the power sequence monitor module to enter the debug mode, and the output control unit further generates the detection signal having a specific data format and selects the output device according to the control signal.

8. The computer debug module as claimed in claim 7, further comprising:
   a plurality of output devices, wherein the output control unit further selects one of the output devices according to the control signal.

9. The computer debug module as claimed in claim 1, wherein the power sequence unit comprises an ACPI (Advanced Configuration and Power Interface) logic circuit.

10. The computer debug module as claimed in claim 9, wherein the power sequence signals comprise a PSON# signal, an SLP_S3#/S3# signal, a PSOUT# signal, a PSIN# signal, and a 3VSB signal, and wherein the monitor unit monitors logic levels of the power sequence signals at a plurality of monitor time points.

11. The computer debug module as claimed in claim 1, wherein the digital signals are logic signals defined by a manufacturer of the another chip.

* * * * *